(12) United States Patent
O'Keeffe et al.

(10) Patent No.: US 7,075,526 B2
(45) Date of Patent: Jul. 11, 2006

(54) BUTTON SIMULATING ROTATION OF INPUT DEVICE ROLLER

(75) Inventors: Denis O'Keeffe, Newmarket (IE); Neil O'Connell, Cork (IE); Christian Blandin, Ballincollig (IE)

(73) Assignee: Logitech Europe S.A., Romanel-sur Morges (CH)

( * ) Notice: Subject to any disclaimer, the term of this patent is extended or adjusted under 35 U.S.C. 154(b) by 404 days.

(21) Appl. No.: 10/462,012

(22) Filed: Jun. 13, 2003

(65) Prior Publication Data

US 2004/0041790 A1    Mar. 4, 2004

Related U.S. Application Data

(60) Provisional application No. 60/388,879, filed on Jun. 14, 2002.

(51) Int. Cl.
*G09G 5/00* (2006.01)
(52) U.S. Cl. ........................ 345/184; 345/163; 345/156
(58) Field of Classification Search ........ 345/156–167, 345/184; 463/36, 38; 200/331–332, 335, 200/339
See application file for complete search history.

(56) References Cited

U.S. PATENT DOCUMENTS

| | | | | |
|---|---|---|---|---|
| 5,446,481 A | * | 8/1995 | Gillick et al. | 345/163 |
| 6,075,575 A | * | 6/2000 | Schein et al. | 348/734 |
| 6,198,473 B1 | * | 3/2001 | Armstrong | 345/163 |
| 6,281,881 B1 | * | 8/2001 | Siddiqui et al. | 345/164 |
| 6,407,749 B1 | * | 6/2002 | Duke | 345/684 |
| 6,456,275 B1 | * | 9/2002 | Hinckley et al. | 345/156 |
| 6,741,233 B1 | * | 5/2004 | Swan et al. | 345/161 |
| 6,830,394 B1 | * | 12/2004 | Felcman et al. | 400/472 |
| 6,844,873 B1 | * | 1/2005 | Johnson | 345/163 |
| 6,879,316 B1 | * | 4/2005 | Kehlstadt et al. | 345/163 |
| 2004/0001042 A1 | * | 1/2004 | Lindhout et al. | 345/156 |

FOREIGN PATENT DOCUMENTS

WO    WO 9843202 A1 * 10/1998

* cited by examiner

*Primary Examiner*—Alexander Eisen
(74) *Attorney, Agent, or Firm*—Townsend and Townsend and Crew LLP (57) ABSTRACT

An input device comprises a housing, and a user-movable roller having an exposed portion exposed from the housing. The roller is rotatable in a first rotational direction to generate first rotational signals. A first user-manipulable button is exposed from the housing for contact by a user and configured to simulate rotation of the roller in the first rotational direction and to generate the first rotational signals when pressed and maintained in a pressed position. In some embodiments, the roller is rotatable in a second rotational direction opposite from the first rotational direction to generate second rotational signals. A second user-manipulable button is exposed from the housing for contact by the user and configured to simulate rotation of the roller in the second rotational direction and generate the second rotational signals when pressed and maintained in a pressed position.

20 Claims, 9 Drawing Sheets

BUTTON SIMULATING ROTATION OF INPUT DEVICE ROLLER

CROSS-REFERENCE TO RELATED APPLICATIONS

This application claims the benefit of U.S. Provisional Application No. 60/388,879, filed Jun. 14, 2002, which disclosure is incorporated herein by reference.

BACKGROUND OF THE INVENTION

The present invention relates to input devices and, more particularly, to an input device such as a mouse or a trackball which includes a roller and a pair of buttons that simulate roller rotation in opposite rotational directions.

Some mouse devices and trackballs include a roller for such functions as controlling cursor movement along a third axis, scrolling, or zooming. The roller is operated by a user finger much like a dial on a radio. For instance, U.S. Pat. No. 5,473,344 shows a user operable roller which includes a shaft extending to an optical encoder wheel. U.S. Pat. No. 5,530,455 discloses a roller having a shaft which drives a belt connected to a pulley on a separate encoder.

BRIEF SUMMARY OF THE INVENTION

The present invention provides a roller in an input device such as a mouse, a trackball, a joystick, a game pad, or the like. One or more buttons are provided to simulate rotation of the roller and generate corresponding rotational signals when pressed and maintained in a pressed position. This feature allows the simulation of quick roller rotation and generate corresponding rotational signals by maintaining a button press on a button with reduced stress to the user's hand and fingers.

In accordance with an aspect of the invention, an input device comprises a housing, and a user-movable roller having an exposed portion exposed from the housing. The roller is rotatable in a first rotational direction to generate first rotational signals. A first user-manipulable button is exposed from the housing for contact by a user and configured to simulate rotation of the roller in the first rotational direction and to generate the first rotational signals when pressed and maintained in a pressed position.

In some embodiments, the roller is rotatable in a second rotational direction opposite from the first rotational direction to generate second rotational signals. A second user-manipulable button is exposed from the housing for contact by the user and configured to simulate rotation of the roller in the second rotational direction and generate the second rotational signals when pressed and maintained in a pressed position. The roller lies on a plane, and the first and second buttons are disposed along the plane of the roller and on opposite sides of the roller.

In specific embodiments, the first button includes a first head exposed from the housing for pressing by a user and connected to a first extension which moves with the first head when pressed by the user to activate a first switch. The first head is offset from the first extension so as to be disposed adjacent the exposed portion of the roller on one side. The second button includes a second head exposed from the housing for pressing by a user and connected to a second extension which moves with the second head when pressed by the user to activate a second switch. The second head is offset from the second extension so as to be disposed adjacent the exposed portion of the roller on the opposite side.

In accordance with another aspect of the present invention, an input device comprises a user-movable roller configured to be contacted and rotated by a user in a first rotational direction to generate first rotational signals and in a second rotational direction opposite from the first rotational direction to generate second rotational signals. A first user-manipulable button is configured to be contacted by a user. A second user-manipulable button is configured to be contacted by the user. The input device further comprises a mechanism for supporting the first and second user-manipulable buttons, to activate a first switch when the first button is pressed and maintained in a pressed position to simulate rotation of the roller in the first rotational direction and to generate the first rotational signals, and to activate a second switch when the second button is pressed and maintained in a pressed position to simulate rotation of the roller in the first rotational direction and to generate the first rotational signals.

In some embodiments, the first button and the second button are attached together by a flexible connecting member prior to assembly into the input device. The first button when pressed and maintained in the pressed position is configured to simulate rotation of the roller in the first rotational direction at a preset rotational rate, and the second button when pressed and maintained in the pressed position is configured to simulate rotation of the roller in the second rotational direction at another preset rotational rate.

In accordance with another aspect of the invention, an input device comprises a first user-manipulable button configured to be contacted by a user to simulate rotation of a roller in a first rotational direction at a first preset rotational rate and generate first rotational signals when the first button is pressed and maintained in the pressed position; and a second user-manipulable button configured to be contacted by the user to simulate rotation of the roller in a second rotational direction opposite from the first rotational direction at a second preset rotational rate and generate second rotational signals when the second button is pressed and maintained in the pressed position.

In specific embodiments, the first button and the second button are structurally connected to be spaced from one another to position the roller therebetween. The first preset rotational rate and the second preset rotational rate are equal.

DETAILED DESCRIPTION OF THE INVENTION

Figure 1:
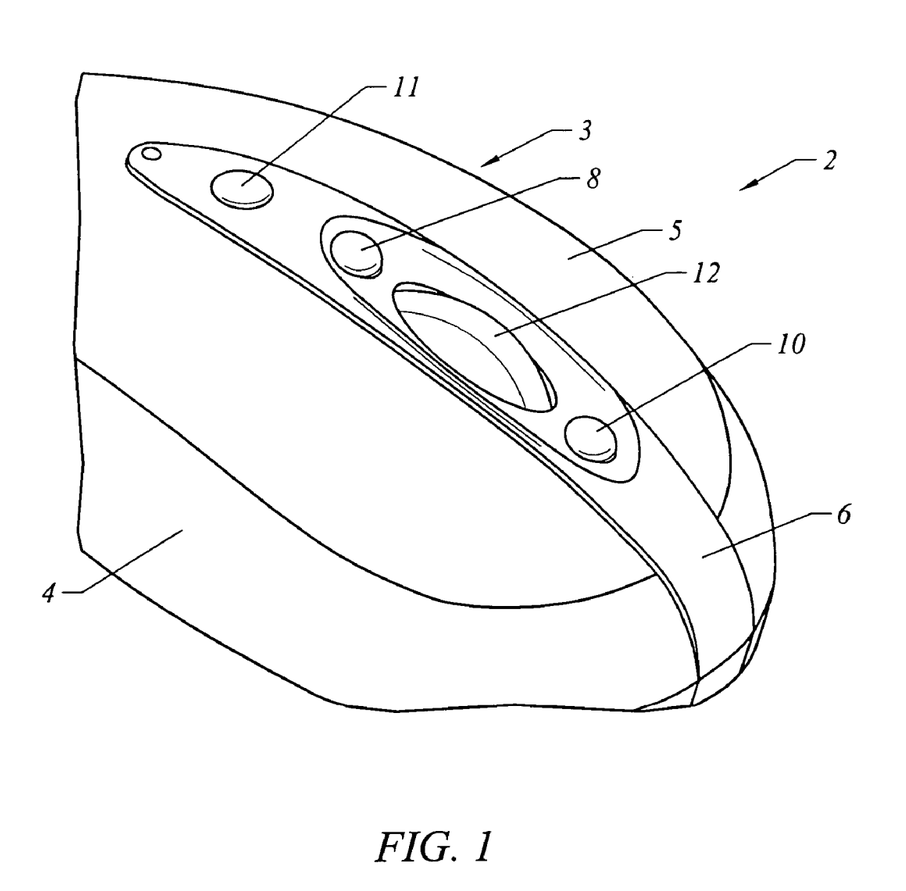
FIG. 1 is a perspective view of an input device having a roller and buttons according to an embodiment of the present invention.

FIG. 1 shows an input device 2, which may be a mouse, a trackball, or the like. The input device 2 includes a housing 3, typically having a base or bottom case 4 and a top or top case 5. A separate island cover 6 may be provided for the user-manipulable members. In the embodiment shown, the user-manipulable members include an up button 8, a down button 10, a third button 11 which may be a special function button, and a roller 12. Additional user-manipulable members may be provided in other embodiments. The roller 12 extends through a slot of the housing 3 to allow a user's finger to contact and rotate the roller 12. The buttons 8, 10, 11 are also exposed through openings in the housing 3.

Figure 2:
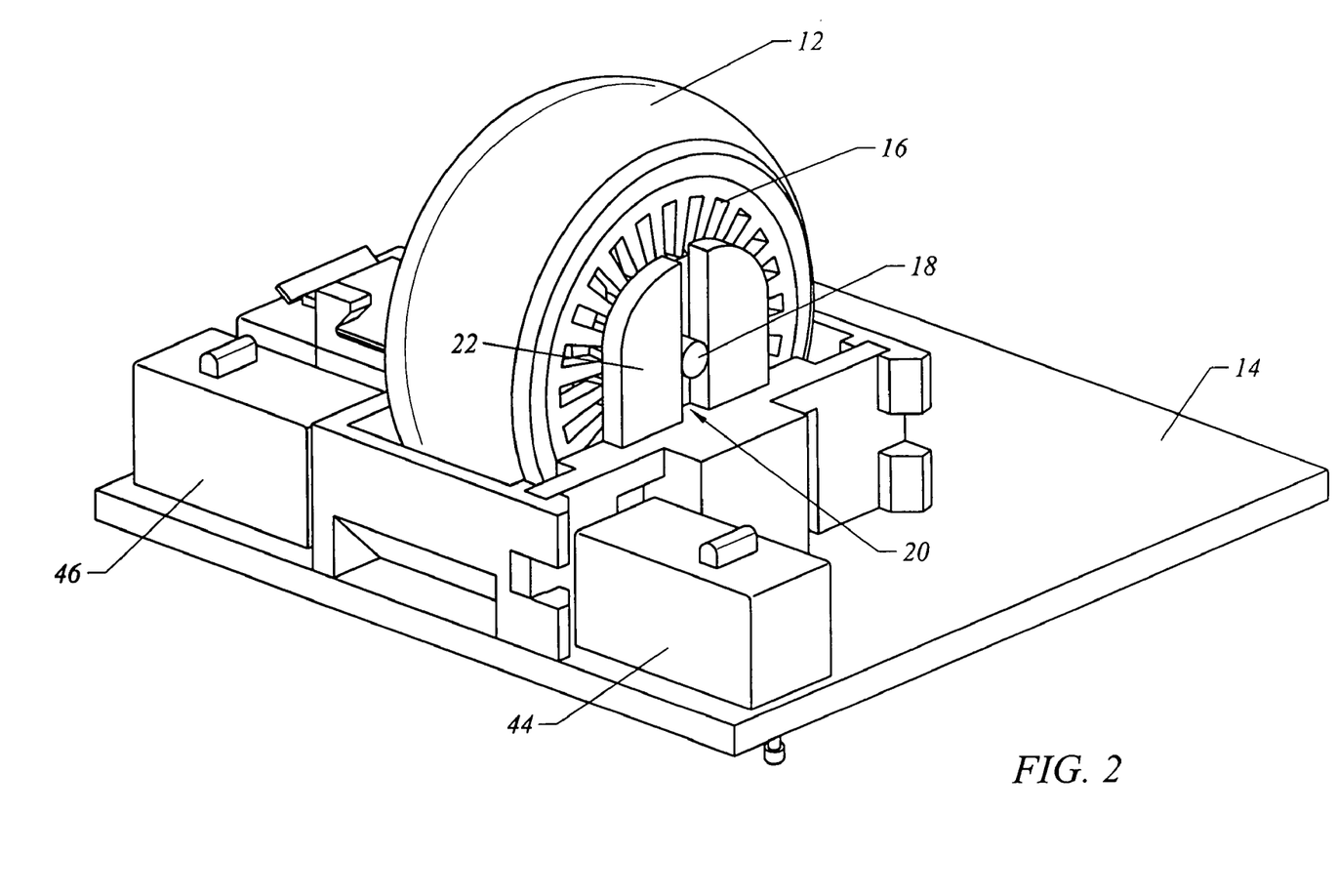
FIG. 2 is a perspective view of the roller according to one embodiment of the invention.
Figure 3:
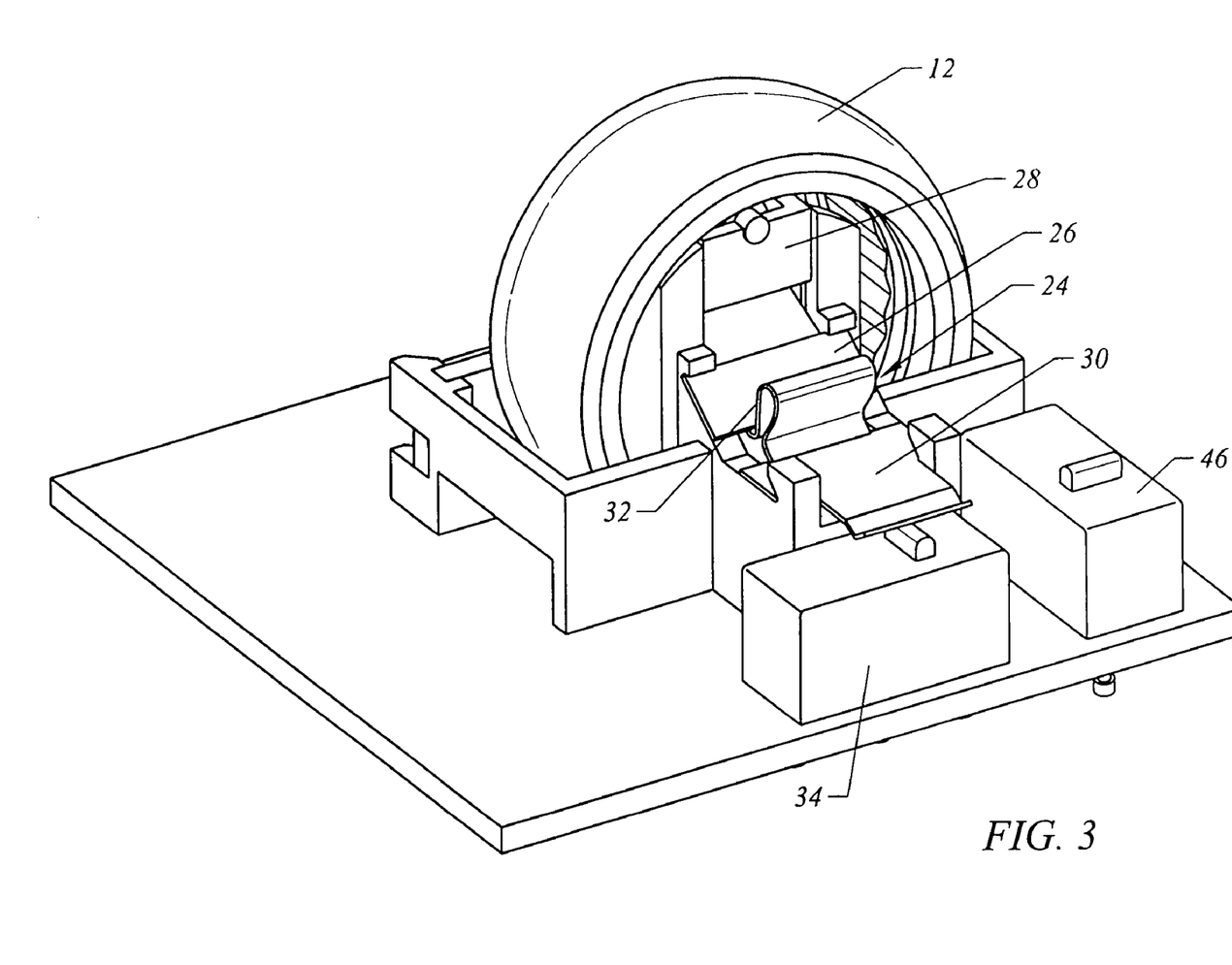
FIG. 3 is a perspective view of the opposite side of the roller of FIG. 2.
Figure 4:
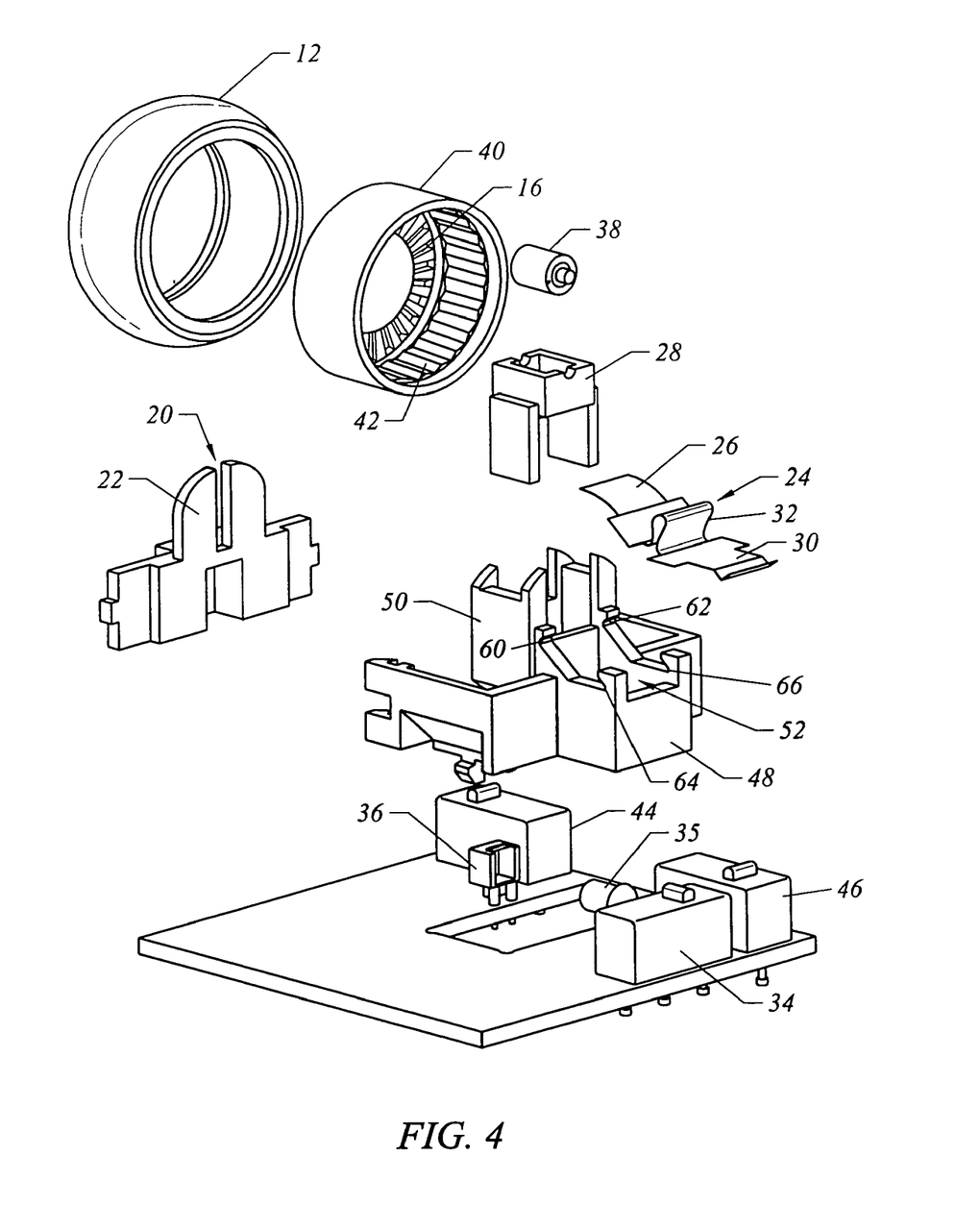
FIG. 4 is an exploded perspective view of the roller of FIG. 3.

Various ways of implementing a roller in an input device are known in the art. One example is shown in FIGS. 2–4 merely for illustrative purposes, and is not meant to limit the scope of the present invention. It is understood that other roller configurations may be used.

FIG. 2 illustrates a roller 12 mounted over a substrate 14 which is mounted inside the input device housing 3, with the roller 12 extending out through a slot in the housing 3 for user actuation. The roller 12 has a number of slits 16 that are elongated and extend radially from the center. An emitter and a detector are used to detect rotation of the roller 12 by monitoring light transmitted from the emitter to the detector through the slots 16, as described below. The number of slits 16 can vary from six to forty-eight or even more. In a preferred embodiment, the number of slits 16 is ¼ the number of ratchets of the roller 12, or a multiple thereof. The ratchets are generated by a ratchet producing mechanism as described below. By incorporating the slits 16 into the roller body itself, the need for a coupling mechanism to a separate encoder wheel is eliminated.

The roller 12 can move up and down in translation. The roller 12 rotates about an inner roller or ring (not shown in FIG. 2) which rotates about an axle 18. The axle 18 is mounted in a slot 20 in a support structure 22. By aligning the emitter and detector along the vertical axis even with the slot 20, the up and down movement of the roller will not affect the detection of the rotational movement.

FIG. 3 shows the opposite side of the roller 12 which is open. An internal mechanism produces a ratchet effect, discussed below, as well as an attachment to a spring 24. The spring 24 connects with a first, flat portion 26 to an internal support structure 28 for the roller 12. The spring 24 includes an additional flat portion 30 over a microswitch 34, with the flat portions 26, 30 being joined by a curved or loop portion 32. The flat portions 26, 30 are rigid. When the roller 12 is depressed, the flat portion 30 will contact the microswitch 34, providing an activating signal. In an alternate embodiment, an optical switch may be used to detect the depression of the roller 12, with an emitter and detector positioned below the roller 12 normally, so that they have the light path blocked when the roller 12 is depressed. Alternatively, the light beam may be interrupted by the spring or a lever, or reflective detection may be used.

As shown in the exploded view of FIG. 4, an optical detector 36 is mounted along the vertical axis of the roller 12, with a corresponding photoemitter or LED 35 on the other side. Alternately, the position of the emitter and detector may be reversed, but preferably the detector 36 is adjacent the slots 16 so that light does not diverge as much after passing through the slots 16, allowing more accurate measurement.

Also shown more clearly in FIG. 4 is the support structure 28 which holds a second, smaller roller 38. A ring 40 is mounted inside the roller 12 in a press fit configuration. The ring 40 is the portion including the slots 16 on one end. In addition, the ring 40 includes an undulating or sawtooth-type inner surface 42. The small roller 38 is biased against this undulating surface by the action of the spring 24 pushing up against the bottom of the support structure 28 of the small roller 38. Further, this mechanism is the actual support for the small roller 38, which is pushed up against the main skeleton, portion 50, and extends through a slot in the input device housing 3. Thus, when the user moves the roller 12, the user feels a spring-back or ratchet-type resistance due to the spring action of the small roller 38, giving it the feel of a mechanical, ratchet encoder wheel, while it actually uses optical encoding for recording its position. The use of the small roller 38 improves the durability of the mechanism compared to prior designs that simply spring bias an element against a sawtooth surface.

Moreover, the spring 24 is configured so that the same spring not only provides the upward support for the roller 12, but when the roller 12 is depressed, will press to activate the microswitch 34. This is possible through the unique use of the flat portions 26, 30 of the spring 24 connected by the loop portion 32. The loop portion 32 is under stress, having been compressed upon assembly. The loop portion 32 generates a downward force on the flat portion 26 to cause the flat portion 30 to also go down, rather than up. This allows an easy mounting of the microswitch 34 underneath the flat portion 30, with it being actuated when the roller 12 is depressed. The flat portion 26 pivots about a pivot point at notches 60, 62. Similarly, the flat portion 30 pivots about a pivot point where it contacts notches 64, 66. In operation, the flat portion 26 will pivot upward at the end attached to the loop portion 32, which will move that end of the flat portion 30 up, causing the far end over the microswitch 34 to pivot down. FIG. 4 also shows microswitches 44, 46 for the buttons 7, 8 disposed on opposite sides of the roller 12 (FIG. 1) to provide the standard clicking functions for the input device 2.

Note that the specific embodiment of the roller 12 shown and described is merely for illustrative purposes. Other rollers having different configurations and structures, including those having an encoder separate and spaced from the roller and those employing a different encoder such as a mechanical encoder, may be used with the input device 2.

Figure 5:
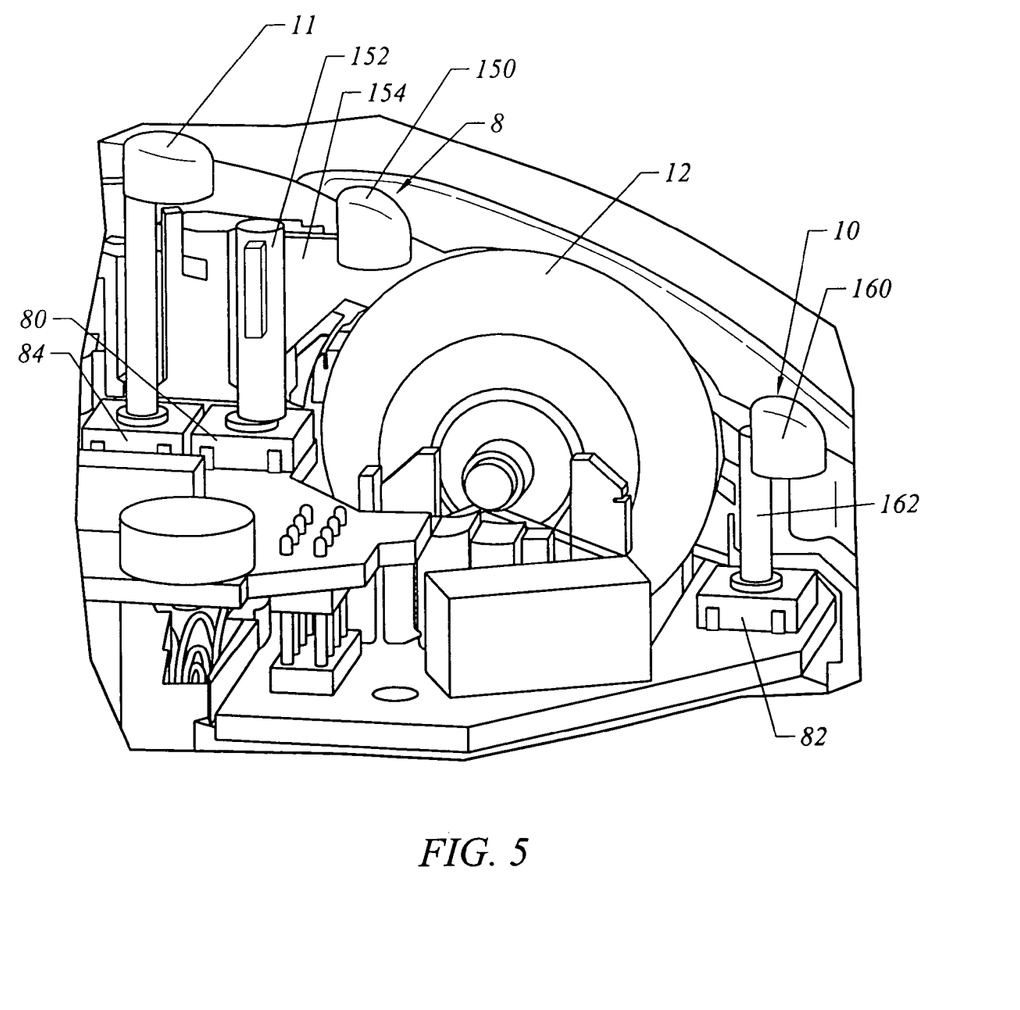
FIG. 5 is a perspective view of the interior of the input device of FIG. 1 illustrating the arrangements of a roller and buttons according to an embodiment of the invention.

As shown in FIG. 5, the buttons 8, 10, 11 are disposed to activate corresponding switches 80, 82, 84, respectively. In one specific embodiment, activation of the up switch 80 by pressing on the up button 8 is configured to simulate upward scrolling or rotation of the roller 12, and activation of the down switch 82 by pressing on the down button 10 is configured to simulate downward scrolling or rotation of the roller 12. By holding down the up button 8 or the down button 10, the up switch 80 or down switch 82 generates signals that represent continuous up or down rotation or scrolling of the roller 12. This allows the user to simulate continuous up or down rotation of the roller 12 more easily and at a faster rate than turning the roller 12. The up button 8 and down button 10 may be referred to as cruise control buttons for the roller 12. Activation of the special function switch 84 by pressing on the special function button 11 generates a signal to perform a special function such as, for example, document switching or window switching (alt-tab), opening a home page, or the like.

Figure 6:
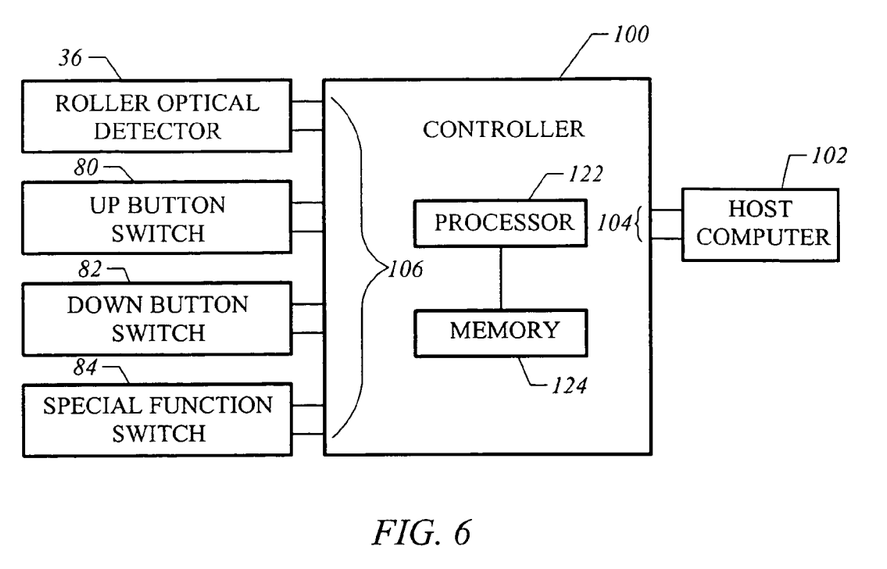
FIG. 6 is a block diagram block diagram of the input device of FIG. 1.

FIG. 6 shows a block diagram illustrating the controller 100 of the input device 2 communicating with the host computer 102 via serial ports 104, through which the input device 2 may obtain power from the host computer 102. The controller 100 receives input from the various input members of the input device 2 via a plurality of input lines 106. As shown in FIG. 6, the input members include the roller optical detector 36, up button switch 80, down button switch 82, and special function button switch 84. Of course, more or fewer input members may be provided in other embodiments.

The controller 100 includes a processor 122 and a memory 124. The processor 122 typically includes analog and digital input/output boards, interface boards, and/or various controller boards. The memory 124 may be a disk drive or other computer-readable medium. The controller 100 receives various position and actuation data from the input members, and processes the data and transfers the data to the host computer 102 by executing software or firmware in the form of a computer program stored in a computer-readable medium such as the memory 124. The computer program includes sets of instructions that dictate the processing of the input data. The computer program code can be written in any known computer readable programming language.

Figure 7:
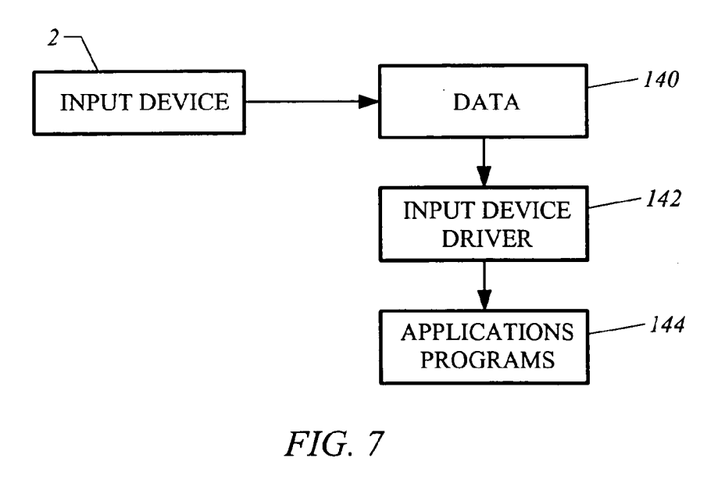
FIG. 7 is a flow diagram illustrating the operation of the input device of FIG. 1.

As shown in the flow diagram of FIG. 7, the input device 2 generates input data 140 and sends the data 140 to a host or input device driver program 142. The host driver program 142 interprets the data and sends the data to applications programs 144 which may typically be stored in the host computer 102. For instance, the driver program 142 may translate certain position data into virtual screen definitions to maintain a virtual screen, and may calculate the current cursor position within the virtual screen and maintain presentation and movement of the cursor.

In a specific embodiment, the driver program 142 interprets activation of the up and down switches 80, 82 as up and down rotations of the roller 12, respectively. For example, a single press and release of the up or down button (8, 10) to activate the up or down switch (80, 82) may simulate an up or down rotation of the roller 12 by a preset angle (e.g., by rotation through a single slit 16 or by ratchets or roller counts). Maintaining the button press on the up or down switch (80, 82) by the up or down button (8, 10) may simulate a continuous up or down rotation of the roller 12. The rate of rotation of the roller 12 simulated by pressing the buttons 8, 10 may be set at a desired level and programmed into the software or firmware stored in the memory 124 of the controller 100. For example, the rate of rotation may be set at a number of slits or number of ratchets or number of roller counts per time interval. This functionality allows the simulation of quick up or down roller rotation by maintaining a button press on the up or down button (8, 10) with reduced stress to the user's hand and fingers.

The applications program 144 (FIG. 7) sees the up or down roller rotation signals generated by pressing the up or down buttons (8, 10), and reacts according to the specific functions assigned thereto. For example, up or down roller rotation may represent up or down cursor movement along a third axis, up or down scrolling through a menu or a page or the like, increased or decreased zooming, or the like. In a game environment, up or down roller rotation may represent firing a weapon or incrementally increasing or decreasing shield level in a video game application.

FIG. 5 shows an offset feature of the up and down buttons 8, 10 which may be implemented in certain preferred embodiments. The up switch 80 is disposed in front of the roller 12. The head 150 of the up button 8 is offset from the shaft or extension 152 which is disposed above the up switch 80. A connecting member 154 connects the head 150 to the shaft 152. In this way, the head 150 of the button 8 which is exposed for contact by the user is positioned closer to the exposed portion of the roller 12, so that the user does not need to move the finger far from the roller 12 to contact the head 150 to press the up button 8 to simulate quick up rotation of the roller 12. Similarly, the head 160 of the down button 10 is offset from the shaft or extension 162 which is disposed above the down switch 82, so that the exposed head 160 is positioned closer to the exposed portion of the roller 12 for easy and convenient actuation by the user.

Figure 8:
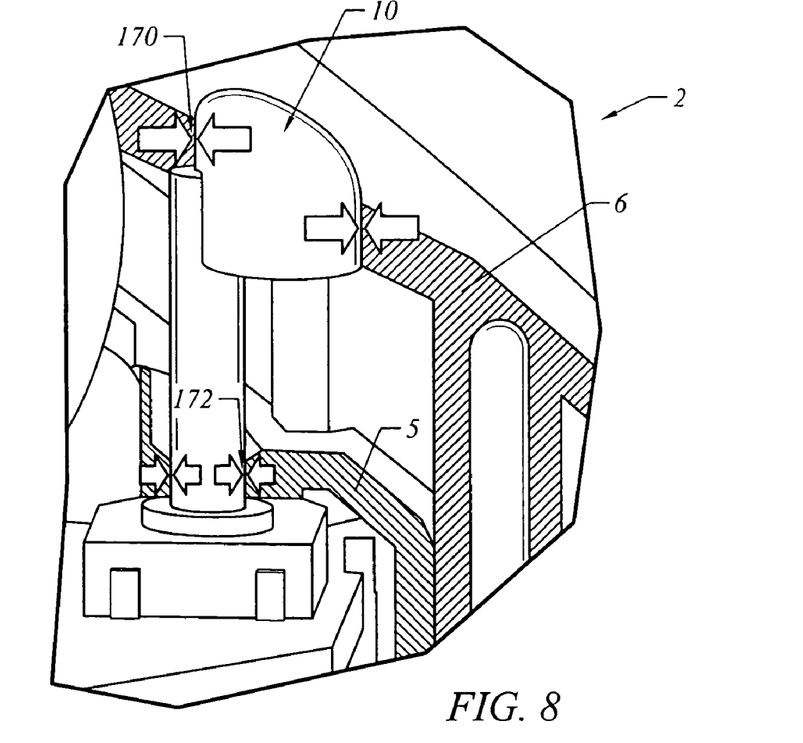
FIG. 8 is a perspective view of the interior of the input device of FIG. 1 illustrating the button configuration.

The buttons 8, 10, 11 are smaller in size than conventional buttons used on input devices such as mice and trackballs. The corresponding switches 80, 82, 84 are desirably low force switches that require low forces on the order of about 50 grams for activation. In addition, each button is surrounded and constrained by holes at the top and at the bottom with relatively small clearances. FIG. 8 illustrates the top clearance 170 and the bottom clearance 172 for the button 10. In this specific embodiment, the top clearance 170 is provided by a hole in the island 6, and the bottom clearance 172 is provided by a hole in the top case 5. The top clearance 170 may be about 0.05 mm, and the bottom clearance 172 may be about 0.1 mm. These clearance amounts are sufficiently small to prevent an off-center look and feel of the button 10. The button 10 is aligned by the holes around the top and bottom portions thereof, and is free to tilt. The button 10 may contact the sides of the holes. Due to the small gaps, the tilting typically will not be felt by the user. This configuration allows relatively large lateral shifting of these parts while still maintaining the low force and small clearances. Similar configurations may be used for the other buttons 8, 11.

The switches 80, 82, 84 are typically located on a PCB mounted on the base 4 of the input device 2. Alternatively, the PCB may be mounted to the top case 4. In either case, the PCB may be parallel with or tilted at an angle relative to the base 4.

Figure 9:
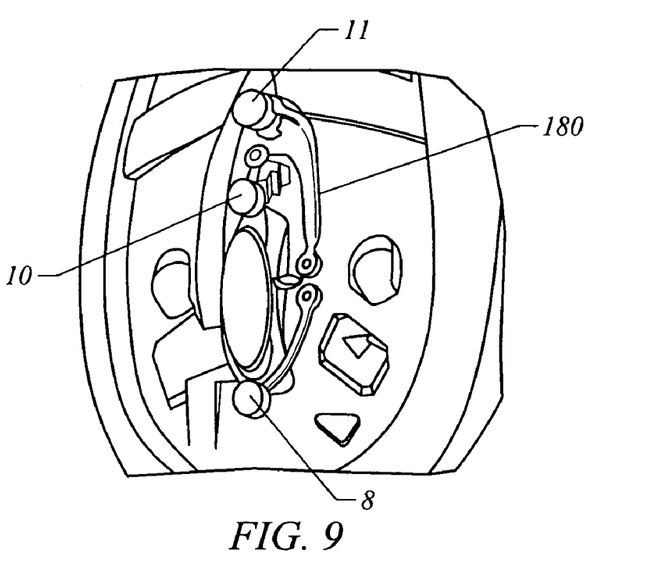
FIG. 9 is a perspective view of joining the buttons as a single part according to an embodiment of the invention.

FIG. 9 shows one way of manufacturing the buttons 8, 10, 11 to facilitate easier assembly. The buttons 8, 10, 11 are attached together by connecting members 180 which are typically flexible beams made of plastic or the like, which may be heat welded together. During assembly, the buttons 8, 10, 11 can be dropped into their respective wells at the same time. Because the connecting members are flexible, the buttons 8, 10, 11 move and operate independently by sliding up and down relative to the input device housing 3. Alternatively, the buttons 8, 10, 11 are separate. The use of separate buttons will provide better feel and easier molding without the constraints of the narrow or thin connecting beams 180.

Figure 10:
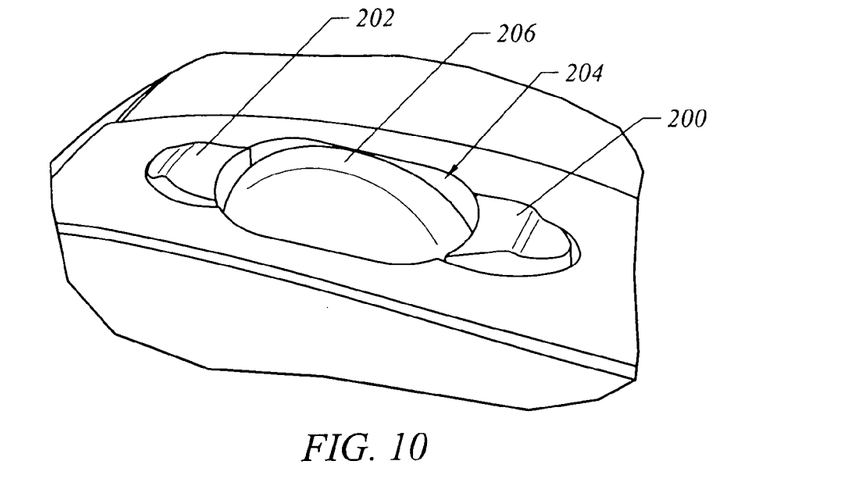
FIG. 10 is a perspective view of the roller and associated buttons arranged according to another embodiment of the invention.

FIGS. 10–14 illustrate alternate ways of implementing the mechanism for activating the up and down switches 80, 82 according to other embodiments of the invention. In FIG. 10, the up button 200 and the down button 202 are merged with the opening 204 for the roller 206, so that the buttons 200, 202 and the roller 206 extend through the input device housing through a single slot or opening 204. The buttons 200, 202 have arrow shapes, and have sculpted contact surfaces that are easier to locate and press with the user's finger. These features provide improved usability of the device.

Figure 11A:
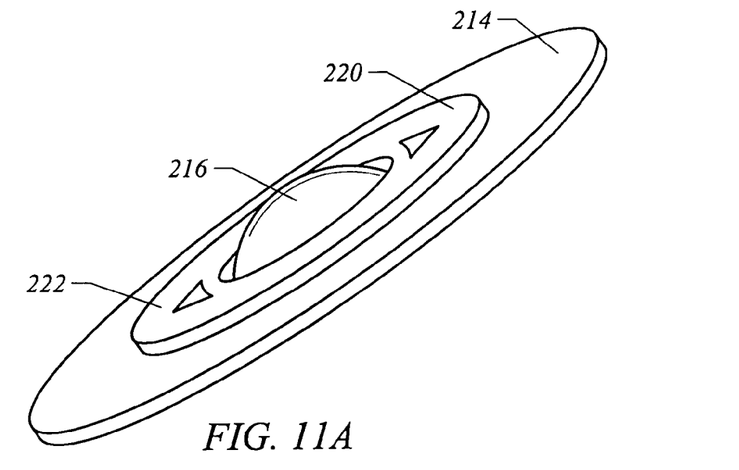
FIG. 11A is a perspective view of a rocking island mechanism for the roller and associated buttons according to another embodiment of the invention.
Figure 11B:
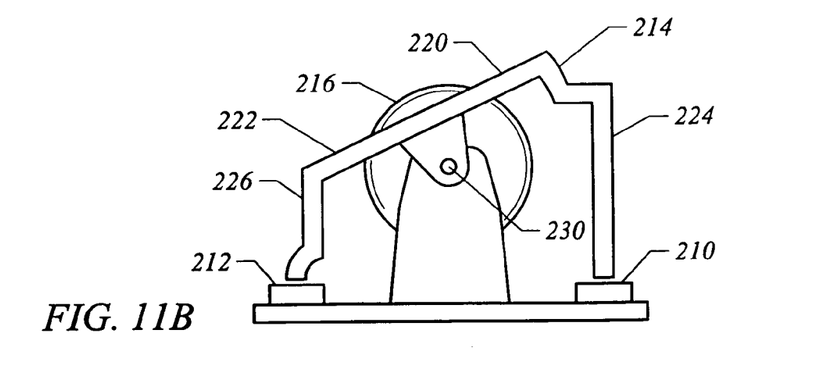
FIG. 11B is an elevational view of the rocking island mechanism of FIG. 11A.

In FIGS. 11A and 11B, the up switch 210, 212 are activated by a rocking island mechanism. The island 214 includes an opening for the roller 216 to protrude therethrough. The island 214 has an up portion 220 and a down portion 222 on opposite sides of the roller 216. The up portion 220 is connected to an up shaft or extension 224 disposed above the up switch 210. The down portion 222 is connected to a down shaft or extension 226 disposed above the down switch 212. The island 214 is rotatable about a pivot 230 on the input device housing. The pivot 230 is oriented parallel to the axis of rotation of the roller. When the user presses the up portion 220 of the island 214, the island 214 pivots upward and the up extension 224 activates the up switch 210. When the user presses the down portion 222 of the island 214, the island 214 pivots downward and the down extension 226 activates the down switch 212.

Figure 12:
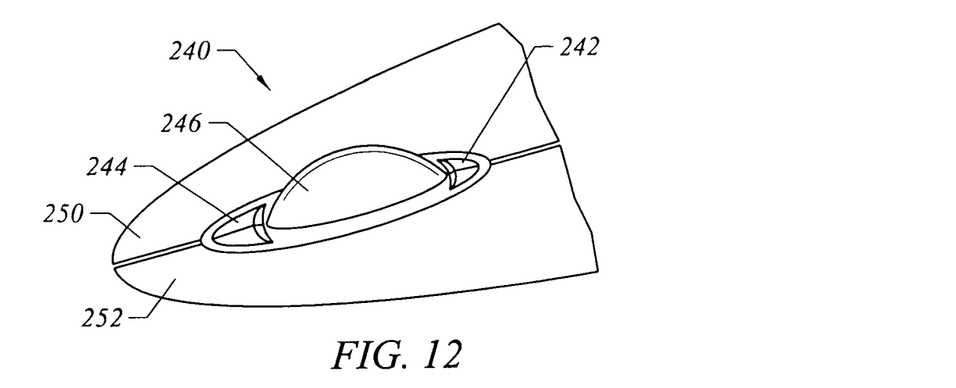
FIG. 12 is a perspective view of the roller and associated buttons arranged with no island according to another embodiment of the invention.

FIG. 12 shows an input device 240 that does not include an island. An up button 242 and a down button 244 are disposed on opposite sides of a roller 246. The buttons 242, 244 and the roller 246 extend through an opening of a top case, which may include a left top case 250 and a right top case 252. The up button 242 and down button 244 are independently operable to activate an up switch and a down switch, respectively. Examples of two different ways of implementing the button mechanism without the island are illustrated in FIGS. 13 and 14.

Figure 13:
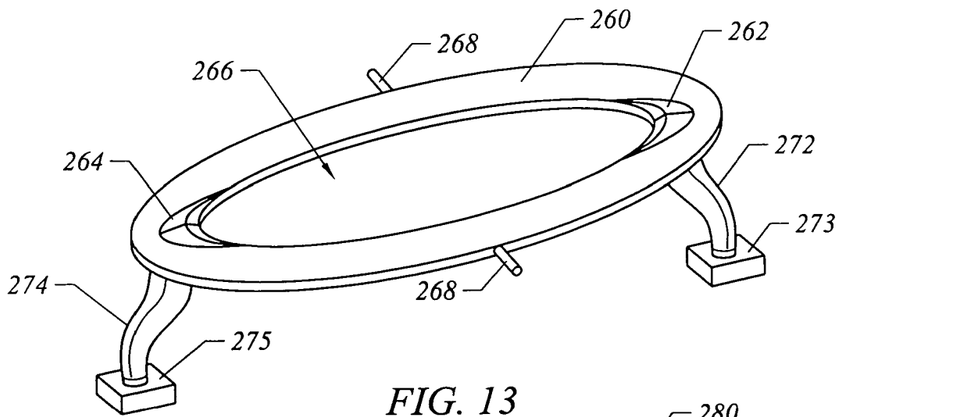
FIG. 13 is a perspective view of an internal pivot rocker mechanism for the roller and associated buttons according to another embodiment of the invention.

In FIG. 13, an internal pivot rocker mechanism is used to support the up and down buttons for switch activation. A pivoting member 260 includes an up button 262 and a down button 264 disposed on opposite sides of a slot 266 to allow a roller to protrude therethrough. The pivoting member 260 is concealed below the top case with the up button 262 and down button 264 exposed above the top case. A pair of aligned pivot rods or pins 268 extend from the pivoting member 260, and are mounted to the input device housing. For example, the pivot pins 268 may be mounted outside the top case, inside the top case, or onto the base of the input device housing. Disposed below the up button 262 is an up extension or shaft 272 for activating an up switch 273. Disposed below the down button 264 is a down extension or shaft 274 for activating a down switch 275. When the user presses the up button 262, the pivoting member 260 pivots upward and the up extension 272 activates the up switch 273. When the user presses the down button 264, the pivoting member 260 pivots downward and the down extension 274 activates the down switch 275.

Figure 14:
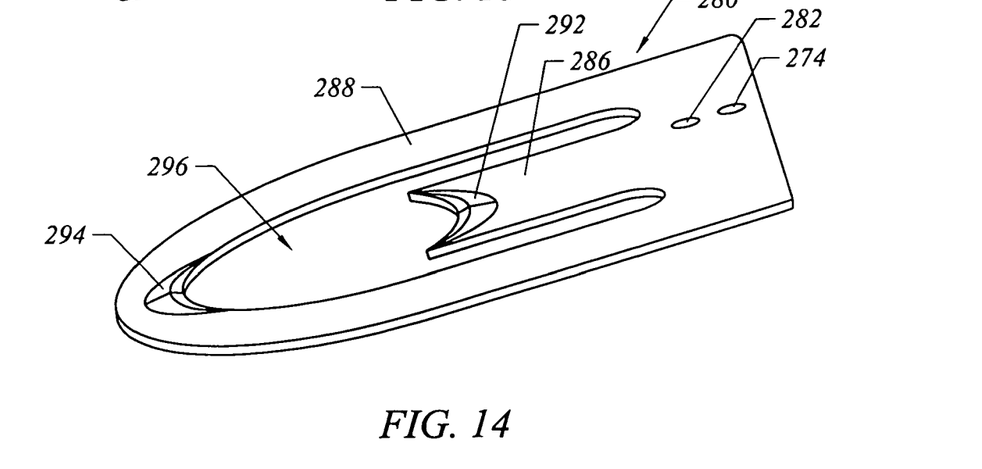
FIG. 14 is a perspective view of a cantilever mechanism for the roller and associated buttons according to another embodiment of the invention.

FIG. 14 illustrates a live hinge or cantilever mechanism for the up and down buttons. A cantilever structure 280 is fixed at a fixed end to the input device housing, preferably a plurality of locations 282, 284 using fasteners or the like. Again the cantilever structure 280 is hidden below the top case. The cantilever structure 280 includes a first cantilever member 286 and a second cantilever member 288 which can independently deflect relative to the fixed end of the cantilever structure 280. The first cantilever member 286 extends along the middle to form an inner portion of the cantilever structure 280 to support an up button 292, while the second cantilever member 288 extends around the first cantilever member 286 along two spaced apart arms to form an outer portion to support a down button 294. The up button 292 is spaced from the down button 294 by a slot 296 through which a roller may extend. The up button 292 is connected to an up shaft or extension for activating an up switch (not shown), while the down button 294 is connected to a down shaft or extension for activating a down switch (not shown), as illustrated in the previous embodiments.

The above-described arrangements of apparatus and methods are merely illustrative of applications of the principles of this invention and many other embodiments and modifications may be made without departing from the spirit and scope of the invention as defined in the claims. For instance, the mechanical switches may be replaced by, for example, membrane switches, touch sensing members, or rubber or metal dome switches which may themselves be the visible external surfaces. Other specific functions may be assigned to the roller movements and the corresponding up and down button presses as desired and presented to the application programs. The scope of the invention should, therefore, be determined not with reference to the above description, but instead should be determined with reference to the appended claims along with their full scope of equivalents.

What is claimed is:

1. An input device comprising:
   a housing;
   a user-movable roller having an exposed portion exposed from the housing, the roller being rotatable in a first rotational direction to generate first rotational signals; and
   a first user-manipulable button exposed from the housing for contact by a user and configured to simulate rotation of the roller in the first rotational direction and to generate the first rotational signals when pressed and maintained in a pressed position;
   wherein the roller is rotatable in a second rotational direction opposite from the first rotational direction to generate second rotational signals, and further comprising a second user-manipulable button exposed from the housing for contact by the user and configured to simulate rotation of the roller in the second rotational direction and generate the second rotational signals when pressed and maintained in a pressed position;
   wherein the first and second buttons are disposed on opposite sides of the roller;
   wherein the first and second buttons are disposed on a pivoting member pivotable relative to the housing around an axis parallel to an axis of rotation of the roller, the pivoting member pivoting in a first direction when the first button is pressed to activate a first switch to generate the first rotational signals, the pivoting member pivoting in a second direction when the second button is pressed to activate a second switch to generate the second rotational signals.

2. The input device of claim 1 wherein the roller lies on a plane which is perpendicular to the axis of rotation, and wherein the first and second buttons are disposed along the plane of the roller.

3. The input device of claim 1 wherein the first button includes a first head exposed from the housing for pressing by a user and connected to a first extension which moves with the first head when pressed by the user to activate a first switch, the first head being offset from the first extension so as to be disposed adjacent the exposed portion of the roller on one side, and wherein the second button includes a second head exposed from the housing for pressing by a user and connected to a second extension which moves with the second head when pressed by the user to activate a second switch, the second head being offset from the second extension so as to be disposed adjacent the exposed portion of the roller on the opposite side.

4. The input device of claim 3 wherein the first head and the second head each have an arrow shape with a sculpted surface for contact by the user's finger.

5. The input device of claim 1 wherein the roller and the first and second buttons are exposed from the housing through a single slot.

6. The input device of claim 1 wherein the pivoting member is exposed from the housing to form an island having a slot between the first button and the second button through which the roller protrudes.

7. The input device of claim 1 wherein the first button is disposed on a first cantilever member having an end fixed to the housing and is movable relative to the fixed end of the first cantilever member, and wherein the second button is disposed on a second cantilever member having an end fixed to the housing and is movable relative to the fixed end of the second cantilever member.

8. The input device of claim 7 wherein the first and second cantilever members are formed from a single cantilever structure and having a common fixed end which is fixed to the housing.

9. The input device of claim 1 wherein the first button and the second button are attached together by a flexible connecting member prior to assembly into the input device.

10. The input device of claim 1 wherein the first button when pressed and maintained in the pressed position is configured to simulate rotation of the roller in the first rotational direction at a preset rotational rate.

11. An input device comprising:
  a user-movable roller configured to be contacted and rotated by a user in a first rotational direction to generate first rotational signals and in a second rotational direction opposite from the first rotational direction to generate second rotational signals;
  a first user-manipulable button configured to be contacted by a user;
  a second user-manipulable button configured to be contacted by the user; and
  pivoting means for supporting the first and second user-manipulable buttons, the pivoting means being pivotable around an axis parallel to an axis of rotation of the roller to activate a first switch when the first button is pressed and maintained in a pressed position to simulate rotation of the roller in the first rotational direction and to generate the first rotational signals, and to activate a second switch when the second button is pressed and maintained in a pressed position to simulate rotation of the roller in the first rotational direction and to generate the first rotational signals;
  wherein the first and second buttons are disposed on opposite sides of the roller.

12. The input device of claim 11 wherein the first button includes a first head configured to be pressed by a user and connected to a first extension which moves with the first head when pressed by the user to activate a first switch, the first head being offset from the first extension so as to be disposed adjacent the roller on one side of the roller, and wherein the second button includes a second head configured to be pressed by a user and connected to a second extension which moves with the second head when pressed by the user to activate a second switch, the second head being offset from the second extension so as to be disposed adjacent the exposed portion of the roller an opposite side of the roller.

13. The input device of claim 11 wherein the first button and the second button are attached together by a flexible connecting member prior to assembly into the input device.

14. The input device of claim 11 wherein the first button when pressed and maintained in the pressed position is configured to simulate rotation of the roller in the first rotational direction at a preset rotational rate, and wherein the second button when pressed and maintained in the pressed position is configured to simulate rotation of the roller in the second rotational direction at another preset rotational rate.

15. The input device of claim 14 wherein the preset rotational rate in the first rotational direction and the preset rotational rate in the second rotational direction are equal.

16. An input device comprising:
  a housing;
  a user-movable roller having an exposed portion exposed from the housing, the roller being rotatable in a first rotational direction to generate first rotational signals; and
  a first user-manipulable button exposed from the housing for contact by a user and configured to simulate rotation of the roller in the first rotational direction and to generate the first rotational signals when pressed and maintained in a pressed position;
  wherein the roller is rotatable in a second rotational direction opposite from the first rotational direction to generate second rotational signals, and further comprising a second user-manipulable button exposed from the housing for contact by the user and configured to simulate rotation of the roller in the second rotational direction and generate the second rotational signals when pressed and maintained in a pressed position;
  wherein the first and second buttons are disposed on opposite sides of the roller;
  wherein the first button is disposed on a first cantilever member having an end fixed to the housing and is movable relative to the fixed end of the first cantilever member, and wherein the second button is disposed on a second cantilever member having an end fixed to the housing and is movable relative to the fixed end of the second cantilever member; and
  wherein the first and second cantilever members are formed from a single cantilever structure and having a common fixed end which is fixed to the housing.

17. The input device of claim 16 wherein the roller lies on a plane which is perpendicular to the axis of rotation, and wherein the first and second buttons are disposed along the plane of the roller.

18. The input device of claim 17 wherein the first button includes a first head exposed from the housing for pressing by a user and connected to a first extension which moves with the first head when pressed by the user to activate a first switch, the first head being offset from the first extension so as to be disposed adjacent the exposed portion of the roller on one side, and wherein the second button includes a second head exposed from the housing for pressing by a user and connected to a second extension which moves with the second head when pressed by the user to activate a second switch, the second head being offset from the second extension so as to be disposed adjacent the exposed portion of the roller on the opposite side.

19. The input device of claim 16 wherein the first button and the second button are attached together by a flexible connecting member prior to assembly into the input device.

20. The input device of claim 16 wherein the first button when pressed and maintained in the pressed position is configured to simulate rotation of the roller in the first rotational direction at a preset rotational rate.

* * * * *